United States Patent
Jain et al.

(10) Patent No.: US 9,001,672 B2
(45) Date of Patent: Apr. 7, 2015

(54) SYSTEM, METHOD AND APPARATUS CONFORMING PATH COST CRITERIA ACROSS MULTIPLE ABRS

(71) Applicants: Pradeep G. Jain, Mountain View, CA (US); Kanwar D. Singh, Mountain View, CA (US); Palak D. Mehta, Mountain View, CA (US)

(72) Inventors: Pradeep G. Jain, Mountain View, CA (US); Kanwar D. Singh, Mountain View, CA (US); Palak D. Mehta, Mountain View, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 99 days.

(21) Appl. No.: 13/681,672

(22) Filed: Nov. 20, 2012

(65) Prior Publication Data
US 2014/0029438 A1    Jan. 30, 2014

Related U.S. Application Data

(60) Provisional application No. 61/676,796, filed on Jul. 27, 2012.

(51) Int. Cl.
| | | |
|---|---|---|
| G01R 31/08 | (2006.01) | |
| H04L 12/24 | (2006.01) | |
| H04L 12/803 | (2013.01) | |
| H04L 12/751 | (2013.01) | |
| H04L 12/707 | (2013.01) | |
| H04L 12/703 | (2013.01) | |
| H04L 12/723 | (2013.01) | |
| H04L 12/913 | (2013.01) | |

(52) U.S. Cl.
CPC ........ *H04L 41/0668* (2013.01); *H04L 41/0654* (2013.01); *H04L 41/0686* (2013.01); *H04L 47/125* (2013.01); *H04L 45/026* (2013.01); *H04L 41/0659* (2013.01); *H04L 45/22* (2013.01); *H04L 45/28* (2013.01); *H04L 45/50* (2013.01); *H04L 47/724* (2013.01)

(58) Field of Classification Search
CPC ......... H04L 47/10; H04L 47/30; H04L 47/11; H04L 47/15; H04L 45/026; H04L 45/22; H04L 45/28; H04L 45/50; H04W 40/24; H04W 40/02
USPC ......... 370/230, 252, 238, 389, 235, 236, 248, 370/251, 216
See application file for complete search history.

(56) References Cited

U.S. PATENT DOCUMENTS

| | | | |
|---|---|---|---|
| 7,602,702 B1 | 10/2009 | Aggarwal | |
| 7,948,996 B2* | 5/2011 | Kompella | 370/400 |
| 8,243,587 B2* | 8/2012 | Darwish | 370/217 |
| 8,644,325 B2* | 2/2014 | Iovanna et al. | 370/401 |

(Continued)

FOREIGN PATENT DOCUMENTS

WO    WO 2006/044217 A1    4/2006

OTHER PUBLICATIONS

International Search Report and Written Opinion for International Patent Application Serial No. PCT/US2013/051793, mailed Nov. 27, 2013, consists of 8 unnumbered pages.

(Continued)

*Primary Examiner* — Anh Ngoc Nguyen
(74) *Attorney, Agent, or Firm* — Wall & Tong, LLP

(57) ABSTRACT

A system, method and apparatus for adapting the operation of Area Border Routers (ABRs) in a network such that all ABRs use a common tie-breaking mechanism or process to select a particular path where equal cost multiple paths (ECMP) exist.

20 Claims, 3 Drawing Sheets

(56) References Cited

U.S. PATENT DOCUMENTS

| | | | |
|---|---|---|---|
| 8,693,339 B2* | 4/2014 | So | 370/237 |
| 2006/0092952 A1 | 5/2006 | Boutros et al. | |
| 2006/0140111 A1* | 6/2006 | Vasseur et al. | 370/216 |
| 2006/0209716 A1 | 9/2006 | Previdi et al. | |
| 2007/0047469 A1 | 3/2007 | Vasseur et al. | |
| 2008/0069007 A1* | 3/2008 | Vasseur et al. | 370/254 |
| 2008/0198751 A1* | 8/2008 | Li | 370/238 |
| 2009/0135841 A1* | 5/2009 | Vasseur et al. | 370/401 |
| 2009/0207845 A1 | 8/2009 | Guan | |
| 2010/0142531 A1* | 6/2010 | Kansara et al. | 370/392 |
| 2010/0208741 A1 | 8/2010 | Vasseur | |
| 2011/0090786 A1 | 4/2011 | Liu et al. | |
| 2012/0027013 A1 | 2/2012 | Napierala | |
| 2013/0232193 A1 | 9/2013 | Ali et al. | |

OTHER PUBLICATIONS

Aggarwal R., et al., "Extensions to Resource Reservation Protocol—Traffic Engineering (RSVP-TE) for Point-to-Multipoint TE Label Switched Paths (LSPs); rfc4875.txt," May 1, 2005, XP015052419.

Pan P., et al., "Fast Reroute Extensions to RSVP-TE for LSP Tunnels; rfc4090.txt," May 1, 2005, XP015041909.

International Search Report and Written Opinion for International Application No. PCT/US2013/050536, mailed Nov. 13, 2013, Alcatel-Lucent USA Inc., Applicant, 8 pages.

Katz D Ward Juniper Networks D: "Bidirectional Forwarding Detection (BFD); rfc5880.txt", Bidirectional Forwarding Detection (BFD); RFC5880.TXT, Internet Engineering Task Force, IETF; Standard, Internet Society (ISOC) 4, Rue Des Falaises CH—1205 Geneva, Switzerland, Jun. 1, 2010, pp. 1-49, XP015070820, [retrieved on 96/01/2010].

International Search Report and Written Opinion for International Application Serial No. PCT/US2013/050510, dated Oct. 29, 2013, consists of 8 unnumbered pages.

International Search Report and Written Opinion for International Application No. PCT/US2013/051697, mailed Nov. 7, 2013, Alcatel-Lucent USA Inc., Applicant, 8 pages.

Cristel Pelsser et al: "Path Selection Techniques to Establish Constrained Interdomain MPLS LPs", Jan. 1, 2006, Networking 2006. Networking Technologies, Services, and Protocols; Performance of Computer and Communication Networks; Mobile and Wireless Communications Systems Lecture Notes in Computer Science; LNCS, Springer, Berlin, DE, pp. 209-220, XP019030828, ISBN: 978-3-540-34192-5, pp. 209-220.

* cited by examiner

SYSTEM, METHOD AND APPARATUS CONFORMING PATH COST CRITERIA ACROSS MULTIPLE ABRS

CROSS-REFERENCE TO RELATED APPLICATION

This application claims the benefit of U.S. Provisional Patent Application Ser. No. 61/676,796, filed Jul. 27, 2012, entitled SYSTEM, METHOD AND APPARATUS FOR IMPROVED MPLS MANAGEMENT, which application is incorporated herein by reference in its entirety.

FIELD OF THE INVENTION

The invention relates to the field of communication networks such as multi-protocol label switching (MPLS) networks and, more particularly but not exclusively, to route selection tie-breaking mechanisms.

BACKGROUND

Multiprotocol Label Switching (MPLS) enables efficient delivery of a wide variety of differentiated, end-to-end services. Multiprotocol Label Switching (MPLS) traffic engineering (TE) provides a mechanism for selecting efficient paths across an MPLS network based on bandwidth considerations and administrative rules. Each label switching router maintains a TE link state database with a current network topology. Once a path is computed, TE is used to maintain a forwarding state along that path.

As described in more detail in various Internet Engineering Task Force (IETF) Request for Comment (RFC), such as RFC4726 and RFC5151, an Area Border Router (ABR) is a router located between several areas in a hierarchical Open Shortest Path First (OSPF) network. ABRs maintain topology information from multiple areas. In the case of Resource Reservation Protocol (RSVP) Inter-Domain TE-LSPs of type Contiguous LSP each Area Border Router (ABR) triggers a path computation (also referred to as an ERO expansion), before forwarding the RSVP Path message downstream. Thus, each ABR is responsible for calculating TE constrained path for its successive TE-Domain(s) or Area(s). Every such ABR that triggers path a computation for its TE-Domain can have multiple equal-cost paths and has to choose one of them.

In the case where equal cost multiple paths (ECMP) exist for a constrained MPLS TE-LSP which uses RSVP as a signaling protocol, a tie-breaking process to select a particular path is typically used. There are various well known and understood techniques used for tie-breaking of multiple equal-cost paths. The tie-breaking process is executed at the Head-End node where MPLS TE-LSP is configured and Constrained Shortest Path First (CSPF) computation is exercised.

Unfortunately, at present there is no way to cause all the ABRs to select a common type of tie-breaking procedure for ECMP paths such that redundant MPLS TE LSPs would have similar end-to-end paths such that TE constraints are balanced.

SUMMARY

Various deficiencies in the prior art are addressed by systems, methods and apparatus adapting the operation of Area Border Routers (ABRs) in a network such that all ABRs use a common tie-breaking mechanism or process to select a particular path where equal cost multiple paths (ECMP) exist. In this manner, each of primary and backup MPLS TE LSPs such as in a redundant or dual-honed configuration will consist of similar end-to-end paths while balancing TE constraints.

A method according to one embodiment comprises receiving a RSVP path message including an indication of an established LSP cost constraint mechanism; if a next hop from the ABR comprises a loose hop, performing an ERO expansion operation to reach the next hop in accordance with the indicated LSP cost constraint mechanism; and forwarding the RSVP path message including the indication of an established LSP cost constraint mechanism toward a next hop.

The method may be performed by each Area Border Router (ABR) along a LSP. Moreover, each ABR may select a link cost constraint for use by node in a successive TE-Domain, and each ABR may indicate selected link cost constraints via a forwarded RSVP Path message.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a network supporting Resource Reservation Protocol (RSVP) Inter-Domain Traffic Engineering Label Switched Paths (TE-LSPs) of type Contiguous LSP, such as defined in IETF RFC4726 and RFC5151, each of which is incorporated by reference in its respective entirety.

Figure 1:
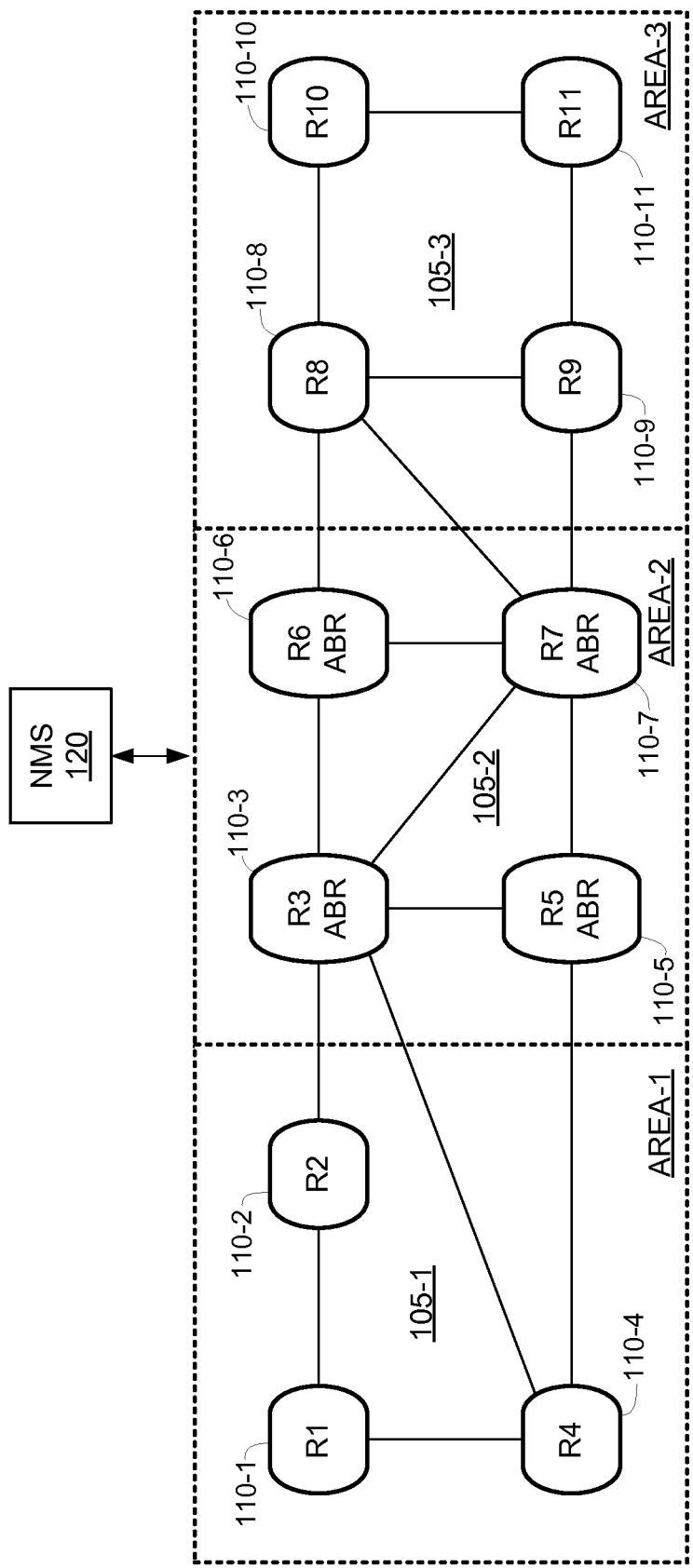
FIG. 1 depicts an exemplary network benefiting from the various embodiments.

FIG. 1 depicts a high-level block diagram of a communication network benefiting from various embodiments. Specifically, the network 100 of FIG. 1 provides a Multi-Protocol Label Switching (MPLS) network supporting Resource Reservation Protocol (RSVP) Inter-Domain Traffic Engineering Label Switched Paths (TE-LSPs) of type Contiguous LSP. The network may be modified by those skilled in the art to use other MPLS related protocols rather that the exemplary protocol discussed herein.

The network 100 includes three IP/MPLS communication networks (CN) 105-1, 105-2 and 105-3, where each communication network 105 is associated with a respective area. The network 100 also includes at least one network management system (NMS) 120. As depicted, NMS 120 is operative to control a plurality of routers 110-1 through 110-11 distributed among the communication network areas 105-1 through 105-3.

First area 105-1 comprises the first 110-1, second 110-2 and fourth 110-4 routers, second area 105-2 comprises the third 110-3, fifth 110-5, sixth 110-6 and seventh 110-7 routers, while third area 105-3 comprises the eighth 110-8, ninth 110-9, tenth 110-10 and eleventh 110-11 routers. It is noted that various routers are interconnected to form thereby paths. Specifically, the following sequence of router connections is depicted in FIG. 1, where adjacent named routers are connected or linked to each other: R1-R2-R3-R6-R8-R10-R11-R9-R7-R5-R4-R1. In addition, R3 is connected/linked to each of R4, R5 and R7, while R7 is additionally connected/linked to R8.

The third 110-3 (R3) and fifth 110-5 (R5) routers operate as Area Border Routers (ABRs) separating the first 105-1 and second 105-2 areas. Similarly the sixth 110-6 (R6) and seventh 110-7 (R7) routers operate as ABRs separating the second 105-2 and third 105-3 areas.

Data packets or datagrams are routed according to ingress and egress virtual connection (VC) labels on a per-service basis. The VC labels are used by the PE routers 130 for demultiplexing traffic arriving from different services over the same set of LSP tunnels.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 3.

The NMS 120 and the various routers 110 operate to support Resource Reservation Protocol (RSVP) Inter-Domain Traffic Engineering Label Switched Paths (TE-LSPs) of type Contiguous LSP.

As previously noted, each of the ABRs depicted in the network 105 of FIG. 1 (e.g., routers R3, R6, R5 and R7) receives an RSVP path message and performs a path computation (also referred to as an ERO expansion) before forwarding the RSVP Path message toward a next router downstream.

Various embodiments utilize a RSVP path message modified to include additional information adapted to communicate a specific mechanism by which the APR shall determine link cost within the context of the path computation. Specifically, the RSVP path message is used to provide a common link cost metric for use as a label switched path (LSP) setup cost constraint. This common link cost metric may comprise IGP cost, or TE-METRIC cost, or some other proxy or mechanism for determining link cost.

By ensuring that all of the ABRs use a common link cost metric, service providers are able to establish end-to-end RSVP TE LSP where each ABR uses common way of cost selection criteria among several paths. And this will result in better utilization of the network resources across multiple domains.

The LSP setup cost constraint is typically defined at the Ingress Label Edge Routers (LERs). For example, the ingress LER typically has the capability to use Interior Gateway Protocol (IGP) cost constraints within the context of the Open Shortest Path First (OSPF) or Intermediate System-to-Intermediate System (IS-IS) adaptive routing protocols. The ingress LER may also have the capability to use the traffic engineering (TE) cost of a link (often referred to as the TE-METRIC) as a cost constraint, instead of the IGP cost. Additional link/path cost mechanisms are metrics may also be utilized.

Thus, in the case of LSP setup there are at least two possible options to be used as a link cost constraint in choosing the path for the LSP setup from a set of available paths; namely, (1) IGP cost of the link as the constraint and (2) TE cost of the link as the constraint. Other link cost constraints may also be used.

New TLV Attribute

Various embodiments enable the communication of cost constraint selection information to an ADR using a new flag or bit setting in an existing LSP attribute or, optionally, a newly defined LSP attribute encoded in Type-Length-Value (TLV) format.

In one embodiment, to indicate to nodes (e.g., ABRs) participating in path computations to select either IGP cost or the TE-METRIC cost of the link as a LSP path cost constraint, one of the bits (e.g., bit 3) within an existing or newly defined LSP attribute TLV is set or cleared, such as an attribute TLV according to RFC5420.3. For example, according to RFC5420.3, attributes carried by new objects are encoded within TLVs as follows, where a Type Field is an identifier of the TLV, a Length Field is used to indicate the total length of the TLV in octets, a Value Field is used to carry the data:

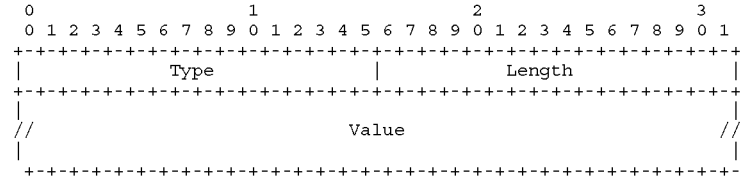

Various embodiments define new flag values in the Attribute Flags TLV, which are carried in the following LSP_ATTRIBUTES Object, such as LSP_ATTRIBUTES class=197, C-Type=1.

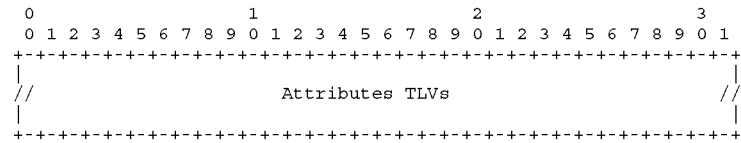

A specific bit number (e.g., bit 3, bit 4 or some other bit) may be assigned a designation of "Use-Metric Bit" or some other designation.

If the Use-Metric Bit is set, then the node responsible for path expansion (i.e., the ABR) is to use the TE-Metric for its Constrained Shortest Path First (CSPF) calculation.

If the Use-Metric Bit is clear, then the node responsible for path expansion (i.e., the ABR) is to use the IGP-Metric for its Constrained Shortest Path First (CSPF) calculation.

Thus, in various embodiments an indication of an established LSP cost constraint mechanism is provided via a LSP attribute encoded in Type-Length-Value (TLV) format. In particular, a state of a predefined bit of a LSP_ATTRIBUTES object is used to indicate a selected cost constraint mechanism. For example, if the predefined bit is in a set or "1" state, then a first metric or cost constraint is selected, whereas if the predefined bit is in a reset or "0" state then a second metric or cost constraint is selected. In various embodiments, multiple bits are provided to provide more than two possible cost constraint selections.

In various embodiments, modifications to selected cost constraint are communicated via additional bits in the LSP_ATTRIBUTES object. For example, additional bits can be used to provide additional information for use in the LSP path calculation, such as service provider preferences, user preferences, historical or instantaneous loading/congestion and so on. Each of these and other factors may be assigned a cost and the use or weight of this cost may be adapted over time.

Thus, various embodiments contemplate an LSP_ATTRIBUTES object having one or more bits associated with a selected metric or cost constraint. Additional embodiments contemplate one or more bits associated with a modification to the selected metric or cost constraint due to any of service provider preferences, user preferences, historical or instantaneous loading/congestion and the like.

Figure 2:
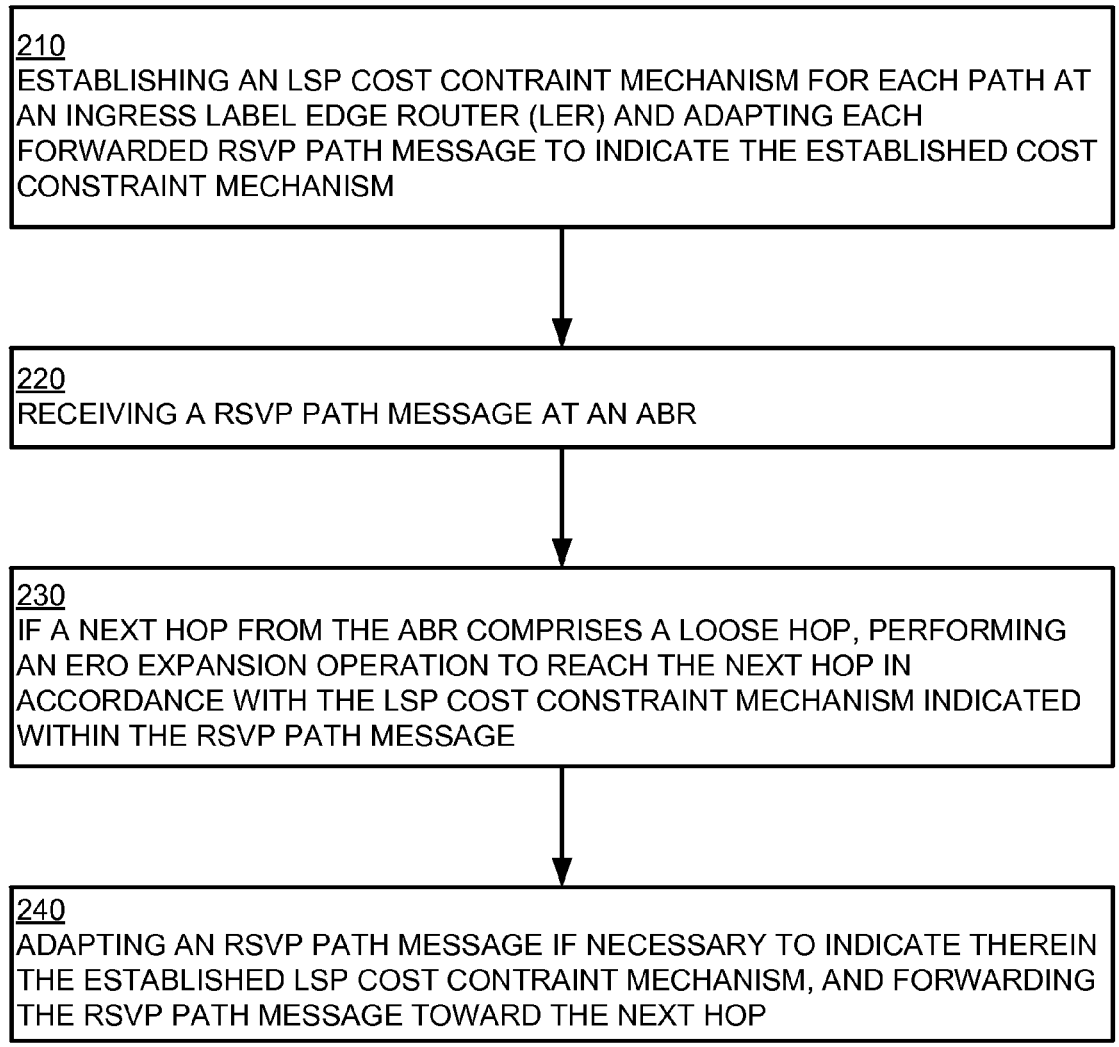
FIG. 2 depicts a flow diagram of a method according to one embodiment.

FIG. 2 depicts a flow diagram of a method according to one embodiment. Specifically, FIG. 2 depicts a method 200 for conforming area border router (ABR) operation to a common cost mechanism for determining the next hop in a label switched path (LSP).

At step 210, an LSP cost constraint mechanism is established at an ingress LER. The cost constraint mechanism may be established automatically, by default, in response to customer service level agreement, in response to service provider requirements or in response to some other consideration.

In one embodiment, the established cost constraint mechanism is indicated by the setting or clearing of a "Use-Metric Bit" as described above. In one embodiment, the established cost constraint mechanism is indicated by the use of a different flag or bit. The established cost constraint mechanism may be indicated using one or more bits within an existing LSP_ATTRIBUTES Object, one or more bits within a new LSP_ATTRIBUTES Object or some combination thereof. Generally speaking, the established cost constraint mechanism may comprise a TE-Metric, IGP-Metric or some other metric.

In various embodiments, the cost constraint mechanism is used to inject additional factors into the LSP path calculation, such as service provider preferences, user preferences, historical or instantaneous loading/congestion and so on. Each of these and other factors may be assigned a cost and the use or weight of this cost may be adapted over time. Thus, the cost constraint mechanism for tie-breaking and the like may include more than just the selection between two default cost metrics.

At step 220, an ABR receives the RSVP path message and examines the appropriate portion of the RSVP path message to determine the established cost constraint mechanism, next hop information and the like.

At step 230, if the next hop from the ABR comprises a loose hop (i.e., a hop to a router not directly connected to the ABR) then a lowest-cost path calculation or ERO expansion operation is performed in accordance with the LSP cost constraint mechanism indicated within the RSVP path message. It is noted that if the next hop from the ABR comprises a strict hop (i.e., a hop to a router directly connected to the ABR) then a lowest-cost path calculation is not necessary.

At step 240, an RSVP path message is adapted as necessary to indicate therein the established LSP cost constraint mechanism and forwarded toward a next hop.

Steps 220-240 are repeated for each ABR in the path.

As an example, and referring to FIG. 1, assume that a label switched path (LSP) is to be determined from R1 to R11. The path of an Inter-Domain TE LSP T1 from R1 (head-end LSR) to R11 (tail-end LSR) is defined on R1 as the following loosely routed path: R1-R3(loose)-R8(loose)-R11(loose). R3, R8, and R11 are defined as loose hops.

After establishing the LSP cost constraint mechanism, R1 determines that the next hop (R3) is a loose hop (not directly connected to R1) and then performs an ERO expansion operation to reach the next loose hops R3. The new ERO could become: R2(S)-R3(S)-R8(L)-R11(L) or R4(S)-R3(S)-R8(L)-R11(L), where S is a strict hop (L=0) and L is a loose hop (L=1). Both the paths R1-R2-R3 and R1-R4-R3 are equal-cost paths and satisfy T1's set of constraints. Based on the configuration the IGP cost or TE-Metric cost is used to select one of these two paths, as defined by the established LSP cost constraint mechanism. Optionally, the selected cost constraint mechanism is communicated to the downstream nodes in RSVP Path Message.

The RSVP Path message is then forwarded by R1 following the path specified in the ERO object (selected by taking the IGP cost or TE-METRIC) and reaches R3 with the following content: R8(L)-R11(L).

R3 determines that the next hop (R8) is a loose hop (not directly connected to R3) and then performs an ERO expansion operation to reach the next loose hops R8. The new ERO could become: R6(S)-R8(S)-R11(L) or R7(S)-R8(S)-R11(L). Based on the cost selection ability signaled in the path message, the ABR node can decide to choose one of the paths above, which satisfies the request cost selection criteria.

The same procedure is repeated by R6 to reach T1's destination (R11) and which may also lead to two equal-cost paths R8-R10-R11 and R8-R9-R11. Now R8 also knows the cost selection method to be used to pick the subsequent Path.

In the above example it is noted that by communicating the cost selection mechanism or procedure to be used end-to-end, every ABR (i.e., R3 and R8) is able to follow similar cost selection procedure and, as result, provide an end-to-end Inter Domain TE-LSP which uses common cost selection process so as to efficiently use the link throughout the different TE-Domains.

The various methods techniques described herein enable service providers to establish end-to-end RSVP TE LSP where each ABR uses common way of cost selection criteria among several paths. And this will result in better utilization of the network resources across multiple domains.

Figure 3:
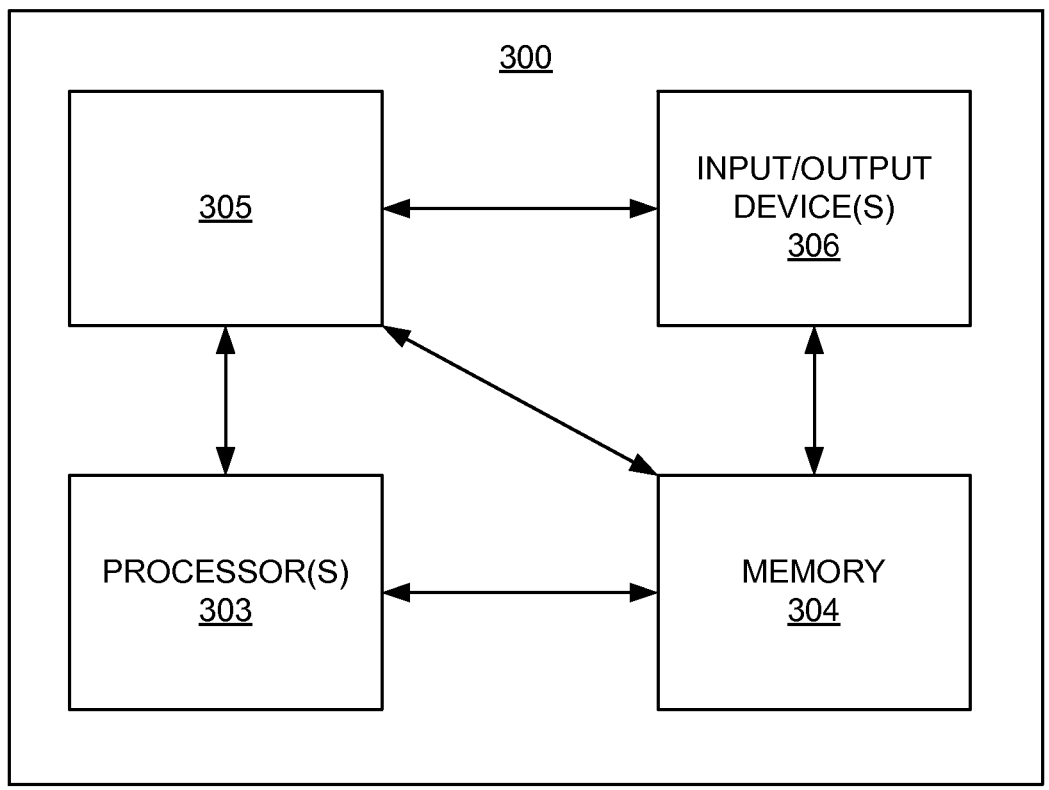
FIG. 3 depicts a high-level block diagram of a computer suitable for use in performing functions described herein.

FIG. 3 depicts a high-level block diagram of a computer suitable for use in performing functions described herein.

As depicted in FIG. 3, computer 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computer 300 depicted in FIG. 3 provides a general architecture and functionality suitable for implementing functional elements described herein or portions network of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
receiving a resource reservation protocol (RSVP) path message including an indication of an established label switched path (LSP) cost constraint mechanism;
if a next hop from an Area Border Router (ABR) comprises a loose hop, performing an explicit route object (ERO) expansion operation to reach the next hop in accordance with the indication of the established LSP cost constraint mechanism; and
forwarding the RSVP path message including the indication of the established LSP cost constraint mechanism toward the next hop.

2. The method of claim 1, wherein said steps are performed by the each Area Border Router (ABR) along a LSP.

3. The method of claim 2, wherein the each ABR selects a link cost constraint for use by nodes in a successive traffic engineering domain (TE-Domain).

4. The method of claim 3, wherein the each ABR indicates the selected link cost constraint via the forwarded RSVP Path message.

5. The method of claim 3, wherein said selected link cost constraint comprises a common link cost metric including any of an interior gateway protocol (IGP) cost constraint metric and a traffic engineering (TE) cost constraint metric.

6. The method of claim 5, where said cost constraint metric is established at an Ingress Label Edge Router (LER).

7. The method of claim 6, wherein said Ingress LER establishes a further cost constraint mechanism in response to a control message received from a network management system (NMS).

8. The method of claim 1, wherein said indication of the established LSP cost constraint mechanism is provided via a LSP attribute encoded in a Type-Length-Value (TLV) format.

9. The method of claim 8, wherein a state of a predefined bit of a LSP_ATTRIBUTES object is used to indicate the established LSP cost constraint mechanism.

10. The method of claim 8, wherein said LSP_ATTRIBUTES object comprises one or more bits associated with the established LSP cost constraint mechanism.

11. The method of claim 10, wherein said LSP_ATTRIBUTES object comprises one or more bits associated with any of service provider preferences, user preferences, historical congestion information and instantaneous congestion information.

12. The method of claim 1, wherein said established LSP cost constraint mechanism is indicated in said RSVP path message via a flag within a LSP attribute Type-Length-Value (TLV).

13. The method of claim 12, where said flag is set to a first state to indicate that a first cost constraint mechanism is established and a second state to indicate that a second cost constraint mechanism is established.

14. The method of claim 13, wherein said first cost constraint mechanism comprises using a traffic engineering (TE) cost constraint metric for a Constrained Shortest Path First (CSPF) calculation.

15. The method of claim 13, wherein said first cost constraint mechanism comprises using an interior gateway protocol (IGP) cost constraint metric for a Constrained Shortest Path First (CSPF) calculation.

16. An apparatus, comprising a processor configured for:
receiving a resource reservation protocol (RSVP) path message including an indication of an established label switched path (LSP) cost constraint mechanism;
if a next hop from an Area Border Router (ABR) comprises a loose hop, performing an explicit route object (ERO) expansion operation to reach the next hop in accordance with the indication of the established LSP cost constraint mechanism; and
forwarding the RSVP path message including the indication of the established LSP cost constraint mechanism toward the next hop.

17. The apparatus of claim 16, wherein said established LSP cost constraint mechanism is indicated in said RSVP path message via a flag within a LSP attribute Type-Length-Value (TLV).

18. The apparatus of claim 17, where said flag is set to a first state to indicate that a first cost constraint mechanism is established and a second state to indicate that a second cost constraint mechanism is established.

19. A tangible and non-transient computer readable storage medium storing instructions which, when executed by a computer, provide a method, comprising:
receiving a resource reservation protocol (RSVP) path message including an indication of an established label switched path (LSP) cost constraint mechanism;
if a next hop from an Area Border Router (ABR) comprises a loose hop, performing an explicit route object (ERO) expansion operation to reach the next hop in accordance with the indication of the established LSP cost constraint mechanism; and forwarding the RSVP path message including the indication of the established LSP cost constraint mechanism toward the next hop.

20. A computer program product wherein a computer is operative to process computer instructions, stored in a non-transitory computer readable storage medium when processed by the computer, to provide a method, comprising:
- receiving a resource reservation protocol (RSVP) path message including an indication of an established label switched path (LSP) cost constraint mechanism;
- if a next hop from an Area Border Router (ABR) comprises a loose hop, performing an explicit route object (ERO) expansion operation to reach the next hop in accordance with the indication of the established LSP cost constraint mechanism; and
- forwarding the RSVP path message including the indication of the established LSP cost constraint mechanism toward the next hop.

* * * * *